(12) United States Patent
Wadzinski et al.

(10) Patent No.: US 9,677,648 B2
(45) Date of Patent: Jun. 13, 2017

(54) WALK-BEHIND POWER EQUIPMENT UNIT HAVING ALL-WHEEL DRIVE CONTROL SYSTEM

(71) Applicant: THE TORO COMPANY, Bloomington, MN (US)

(72) Inventors: Chris A. Wadzinski, Inver Grove Heights, MN (US); John T. Gill, Savage, MN (US); Khari S. Clarke, Minneapolis, MN (US); Ryan M. Petersen, Shoreview, MN (US); John O. Hurst, Lakeville, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 14/988,958

(22) Filed: Jan. 6, 2016

(65) Prior Publication Data

US 2016/0201771 A1    Jul. 14, 2016

Related U.S. Application Data

(60) Provisional application No. 62/103,321, filed on Jan. 14, 2015.

(51) Int. Cl.
*B60K 17/34* (2006.01)
*F16H 7/08* (2006.01)
(Continued)

(52) U.S. Cl.
CPC ........... *F16H 7/0827* (2013.01); *A01D 34/69* (2013.01); *B60K 17/342* (2013.01);
(Continued)

(58) Field of Classification Search
CPC ... B60K 17/105; F16H 7/02; F16H 2059/363; F16H 2700/02; F16H 2059/366;
(Continued)

(56) References Cited

U.S. PATENT DOCUMENTS 2,765,862 A * 10/1956 Tucker, Jr. ............. B60K 17/04
 180/235
3,145,584 A *  8/1964 Fairbank ................... F16H 9/12
 474/1
(Continued)

FOREIGN PATENT DOCUMENTS

CN      101361428 A    11/2009
EP      1 413 498 A     8/2008
(Continued)

OTHER PUBLICATIONS

U.S. Appl. No. 90/013,662, filed Dec. 2015, Re-examination of Application No. 9,055,713.
(Continued)

*Primary Examiner* — Árpád Fábián-Kovács
(74) *Attorney, Agent, or Firm* — Mueting, Raasch & Gebhardt, P.A.

(57) ABSTRACT

A control system for controlling engagement of a first and second transmission of an all-wheel drive (AWD) walk-behind power equipment unit such as a lawn mower. The control system may include a mechanical load balancer to split an input drive force vector into two output force vectors. These two forces act upon associated first and second connection elements coupled to the first and second transmissions, respectively. One transmission may include a resistance element selected to sequence engagement of the first and second transmissions so that both transmissions begin driving their respective wheels at or near the same time even when the wheels associated with one transmission are more heavily-loaded than the wheels associated with the other transmission.

17 Claims, 9 Drawing Sheets

(51) Int. Cl.
*B60K 17/354* (2006.01)
*B60K 17/342* (2006.01)
*F16H 7/02* (2006.01)
*A01D 34/69* (2006.01)
*A01D 101/00* (2006.01)

(52) U.S. Cl.
CPC .............. *B60K 17/354* (2013.01); *F16H 7/02* (2013.01); *A01D 2101/00* (2013.01); *B60Y 2200/225* (2013.01); *F16H 2007/0865* (2013.01)

(58) Field of Classification Search
CPC ........ F16H 9/12; B60L 15/20; B60L 15/2054; A01D 34/69
USPC .................................................. 180/233, 247
See application file for complete search history.

(56) References Cited

U.S. PATENT DOCUMENTS

| | | |
|---|---|---|
| 3,388,759 A | 6/1968 | Plamper et al. |
| 3,433,002 A | 3/1969 | Custance |
| 3,527,034 A | 9/1970 | Hjelmquist |
| 3,818,686 A | 6/1974 | Haffner et al. |
| 4,038,883 A | 8/1977 | Jones |
| 4,205,735 A | 6/1980 | Murray |
| 4,696,661 A * | 9/1987 | Rehlander .................. F16H 9/04 180/6.66 |
| 4,771,852 A | 9/1988 | Nishikawa et al. |
| 4,896,487 A | 1/1990 | Hikishima et al. |
| 4,907,401 A | 3/1990 | Nemoto et al. |
| 5,090,949 A * | 2/1992 | Thoma .................... F16H 47/02 475/200 |
| 5,203,068 A | 4/1993 | Siring |
| 5,228,366 A * | 7/1993 | Thoma ................. B60K 17/105 180/300 |
| 5,377,774 A | 1/1995 | Lohr |
| 5,718,105 A | 2/1998 | Irikura et al. |
| 5,797,251 A | 8/1998 | Busboom |
| 5,813,290 A | 9/1998 | Takahashi et al. |
| 5,829,314 A | 11/1998 | Scura |
| 6,082,083 A | 7/2000 | Stalpes et al. |
| 6,305,238 B1 | 10/2001 | Gabas |
| 6,425,452 B1 * | 7/2002 | Steiner ................... B60K 17/10 180/233 |
| 6,484,829 B1 * | 11/2002 | Cox ........................ A61G 5/061 180/8.1 |
| 6,592,478 B2 | 7/2003 | Wians |
| 6,702,059 B2 | 3/2004 | Blanchard |
| 6,892,517 B2 | 5/2005 | Adams et al. |
| 6,948,299 B2 | 9/2005 | Osborne |
| 7,266,938 B1 * | 9/2007 | Hauser ................... A01D 34/64 56/10.2 R |
| 7,337,598 B2 | 3/2008 | Plouraboue et al. |
| 7,383,913 B1 * | 6/2008 | Tsukamoto .......... B60K 17/105 180/307 |
| 7,484,432 B2 | 2/2009 | Yamanaka |
| 8,226,508 B2 | 7/2012 | Osborne |
| 8,312,946 B2 | 11/2012 | Lahey et al. |
| 9,055,713 B2 | 6/2015 | Helgesen et al. |
| 2002/0178708 A1 | 12/2002 | Williams et al. |
| 2002/0189137 A1 | 12/2002 | Cox et al. |
| 2003/0000190 A1 * | 1/2003 | Busboom ........... A01D 34/6806 56/10.8 |
| 2003/0079452 A1 * | 5/2003 | Toyokawa ............. A01D 34/64 56/14.7 |
| 2003/0182919 A1 * | 10/2003 | Baumann ............... A01D 34/71 56/320.1 |
| 2004/0168424 A1 | 9/2004 | Baumann et al. |
| 2005/0088122 A1 * | 4/2005 | Wakitani .................. B60K 1/02 318/66 |
| 2006/0102410 A1 | 5/2006 | Dvorak |
| 2011/0178684 A1 * | 7/2011 | Umemoto ............. F16H 61/421 701/51 |
| 2013/0046448 A1 * | 2/2013 | Fan ........................ A01D 34/68 701/50 |
| 2015/0113932 A1 * | 4/2015 | Helgesen ............... A01D 34/69 56/11.8 |
| 2015/0135671 A1 | 5/2015 | Helgesen et al. |

FOREIGN PATENT DOCUMENTS

| | | |
|---|---|---|
| EP | 2 170 032 B1 | 4/2012 |
| JP | 2007-053991 A | 3/2007 |
| WO | WO 2009/000344 A1 | 12/2008 |
| WO | WO 2010/083019 A1 | 7/2010 |
| WO | WO 2013/122563 A1 | 8/2013 |

OTHER PUBLICATIONS

U.S. Appl. No. 62/103,321, filed on Jan. 14, 2015 by The Toro Co.
Exhibit A1 Toro's AWD Prototype Walk-Behind Mower (Prototype A). 2001. 8 pages.
Exhibit B1 Toro's AWD Prototype Walk-Behind Mower (Prototype B). 2003. 8 pages.
"22in Recycler Lawn Mower, Operator's Manual," Form No. 3360-862 Rev B. The Toro Company, Bloomington, MN, USA. 2008, 20 pages.
"22in Recycler Lawn Mower, Pats Catalog," Form No. 3360-867 Rev A. The Toro Company, Bloomington, MN, USA. 2008, 24 pages.
"Four Wheel Driven Mower, AS 53 B6 Rb+AS 53 B5, Operating Instructions." As Motor Germany GmbH & Co. KG, Buhlertann, Germany. Aug. 1, 2014, 32 pages.
"Allradmaher [4 wheel drive mower] AS 53 B5-Kat Betriebsanweisung [Operating Instructions]." AS Motor Germany GmbH & Co. KG, Oberrot, Germany. 2008, 40 pages.
"Allradmaher [4 wheel drive mower] AS 53 B6 RB-Kat Betriebsanweisung [Operating Instructions]" and "Explosionszeichnungen [Exploded Drawings]." AS Motor Germany GmbH & Co. KG, Oberrot, Germany. 2008, 48 pages.

* cited by examiner

WALK-BEHIND POWER EQUIPMENT UNIT HAVING ALL-WHEEL DRIVE CONTROL SYSTEM This application claims the benefit of U.S. Provisional Application No. 62/103,321, filed Jan. 14, 2015, which is incorporated herein by reference in its entirety.

Embodiments described herein are directed generally to power equipment units such as walk-behind lawn mowers and, more particularly, to a control system for an all-wheel drive power equipment unit.

BACKGROUND

Outdoor power equipment units such as lawn mowers and the like are known. Such lawn mowers often include a drive system operable to power the wheels during operation, thereby alleviating the operator from providing the propelling force.

Typically, the mower may drive front axles (front wheel drive), or rear axles (rear wheel drive). More recently, mowers capable of simultaneously driving both front and rear axles (all-wheel drive or AWD) have emerged. Such AWD mowers may provide various advantages including improved control over difficult terrain (e.g., undulating terrain and hills) as compared to their rear-wheel or front-wheel drive counterparts. However, depending on weight distribution on the mower wheels, one or more wheels (e.g., a more lightly-loaded wheel) may, as propulsion begins, start rotating prior to one or more of the other wheels. This may result in the more lightly-loaded wheels slipping as propulsion begins.

SUMMARY

Embodiments described herein may provide an improved all-wheel drive power equipment unit having a drive control system that addresses such wheel slippage. In one embodiment, an all-wheel drive power equipment unit is provided that includes a housing comprising front wheels and rear wheels, wherein a front transmission is adapted to selectively provide driving power to the front wheels, and a rear transmission is adapted to selectively provide driving power to the rear wheels. Also included are: a variable speed input device; a first connection element operatively connected to the rear transmission, the first connection element adapted to selectively actuate the rear transmission from a neutral state to an engaged state in response to manipulation of the speed input device; and a second connection element connected to the front transmission, the second connection element adapted to selectively actuate the front transmission from a neutral state to an engaged state in response to the manipulation of the speed input device. A mechanical load balancer is also included and comprises: an input connected to the variable speed input device; a first output connected to the first connection element; and a second output connected to the second connection element, wherein the load balancer is adapted to distribute a force applied at the input equally between the first output and the second output. A resistance element is provided and associated with the front transmission. The resistance element defines a second force resisting actuation of the front transmission, wherein the second force is greater than a first force resisting actuation of the rear transmission.

In another embodiment, an all-wheel drive walk-behind lawn mower is provided. The mower includes: a deck comprising front wheels and rear wheels; a front transmission adapted to selectively provide driving power to the front wheels, the front transmission adapted to rock between a neutral position and an engaged position; and a rear transmission adapted to selectively provide driving power to the rear wheels, the rear transmission adapted to rock between a neutral position and an engaged position. The mower further includes: a variable speed input device; a first connection element connected to the rear transmission, the first connection element adapted to selectively rock the rear transmission from the neutral position to the engaged position; and a second connection element connected to the front transmission, the second connection element adapted to selectively rock the front transmission from the neutral position to the engaged position. A mechanical load balancer is also provided and includes: an input connected to the variable speed input device; a first output connected to the first connection element; and a second output connected to the second connection element, wherein the load balancer is adapted to distribute a force applied at the input equally between the first output and the second output. The mower also includes a resistance element associated with either the rear transmission or the front transmission, the resistance element adapted to define a second force required by the associated first or second connection element to initiate rocking of the respective rear or front transmission from the neutral position, wherein the second force is greater than a first force required by the other of the first or second connection elements to initiate rocking of its respective rear or front transmission from the neutral position.

In another embodiment, a method for controlling an all-wheel drive system for a walk-behind lawn mower is provided and includes: displacing a speed control device, the speed control device adapted to provide an input force to an input of a load balancer; displacing first and second connection elements attached to respective first and second outputs of the load balancer, wherein a first and second output force applied to the first and second connection elements, respectively, is equalized by the load balancer; and applying, simultaneously, the first and second output force to a rear transmission and a front transmission, respectively. The method further includes: actuating the rear transmission and the front transmission from a neutral state toward an engaged state; and providing, with a resistance element, a second force resisting initial actuation of the front transmission, wherein the second force is greater than a first force resisting initial actuation of the rear transmission.

In yet another embodiment, an all-wheel drive walk-behind lawn mower is provided that includes a housing having front wheels and rear wheels, wherein a front transmission is adapted to selectively drive the front wheels, and a rear transmission is adapted to selectively drive the rear wheels, wherein the rear wheels bear more weight than the front wheels. Also included are a variable speed input device; a first cable operatively connected to the rear transmission, the first cable adapted to selectively actuate the rear transmission from a neutral state to an engaged state in response to manipulation of the speed input device; and a second cable connected to the front transmission, the second cable adapted to selectively actuate the front transmission from a neutral state to an engaged state in response to the manipulation of the speed input device. The mower may further include a mechanical load balancer having: an input connected to the variable speed input device; a first output connected to the first cable; and a second output connected to the second cable. The load balancer is adapted to distribute a force applied at the input equally between the first output and the second output. A resistance element may be associated with the front transmission, wherein the resistance element provides a second force resisting actuation of the front transmission, the second force being greater than a first force resisting actuation of the rear transmission. The second force provided by the resistance element causes the front wheels and the rear wheels to begin driving at or near the same time when the mower is operating upon a horizontal turf surface.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
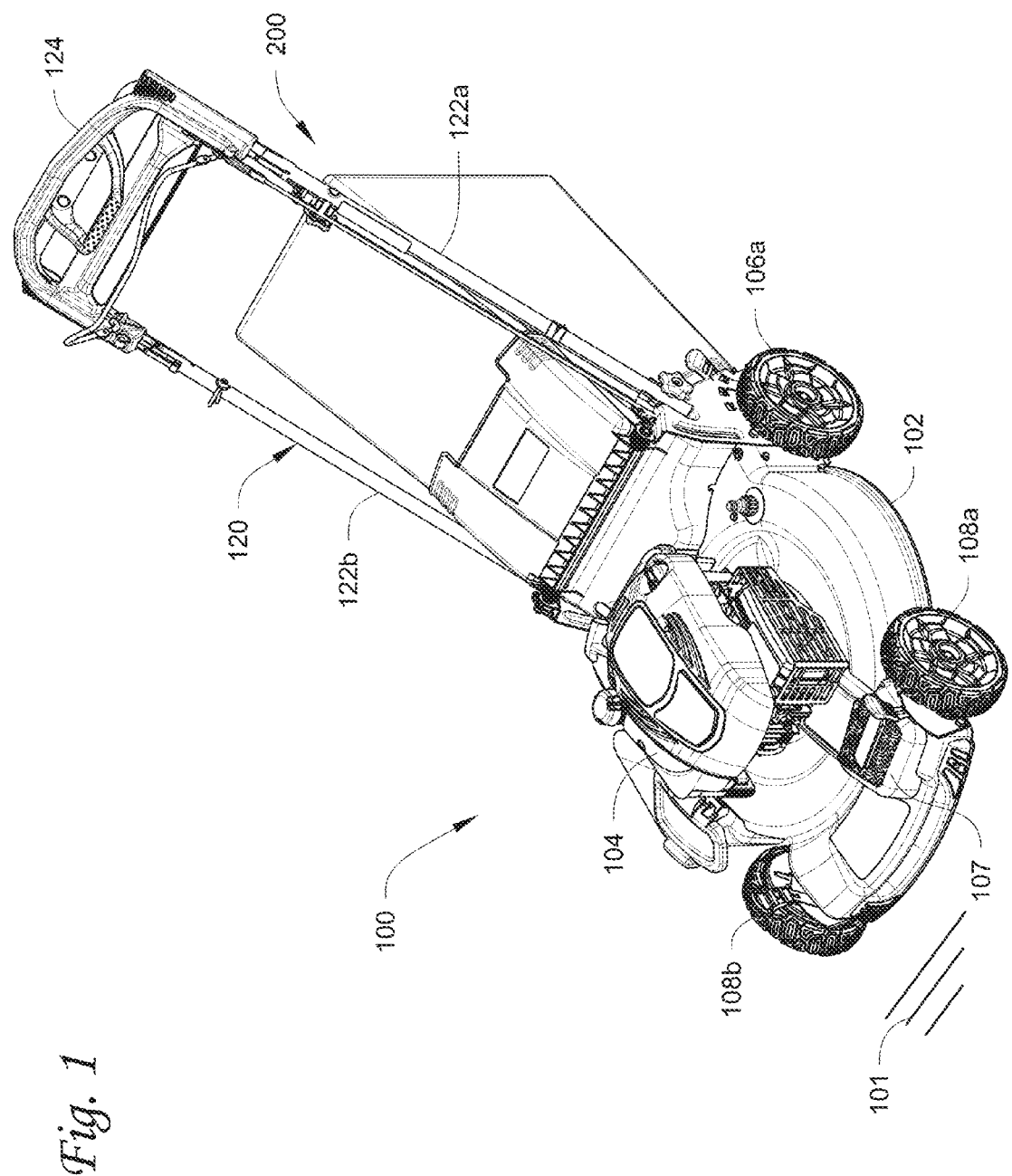
FIG. 1 is a perspective view of a power equipment unit, e.g., an all-wheel drive (AWD) walk-behind lawn mower, incorporating an AWD control system in accordance with one embodiment of the disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Embodiments described herein are directed generally to outdoor power equipment and, more specifically, to all-wheel drive (AWD) control systems and equipment incorporating such systems. For brevity, exemplary control systems are described herein in the context of a walk-behind power lawn mower.

Control systems in accordance with embodiments of the present disclosure may utilize a load balancer adapted to convert a speed input force vector into two output force vectors (e.g., one in communication with each of a front transmission and a rear transmission). Moreover, embodiments of the control system may further include a biasing or resistance element operable to counter the output force vector to one, e.g., the front, transmission. That is, the biasing element may provide a resistance force opposing an actuation force that the control system initially applies to the one (e.g., front) transmission. As a result, engagement of the front and rear transmissions may be timed or sequenced in a way that reduces or eliminates unintended wheel (e.g., front wheel) spin and that allows the front and rear wheels to begin driving at or near the same time.

FIG. 1 shows a power equipment unit configured as a self-propelled, walk-behind lawn mower 100. The mower 100 may include an AWD propulsion system 300 (see, e.g., FIG. 3) and a control system 200 operable to manipulate the same. While described herein in the context of a walk-behind mower, such a configuration is not limiting. That is to say, control systems in accordance with embodiments of the present disclosure may find application to other mowers (e.g., robotic mowers), as well as to other types of power equipment (e.g., dethatchers, aerators, etc.).

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that wheels 106 and 108 rest upon a generally horizontal ground or "turf" surface 101 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

With reference to the figures of the drawing, wherein like reference numerals designate like parts and assemblies throughout the several views, FIG. 1 illustrates an exemplary embodiment of the mower 100. In some embodiments, the exemplary mower may incorporate aspects of mowers described in US2003-0182919 to Baumann et al.

Figure 2:
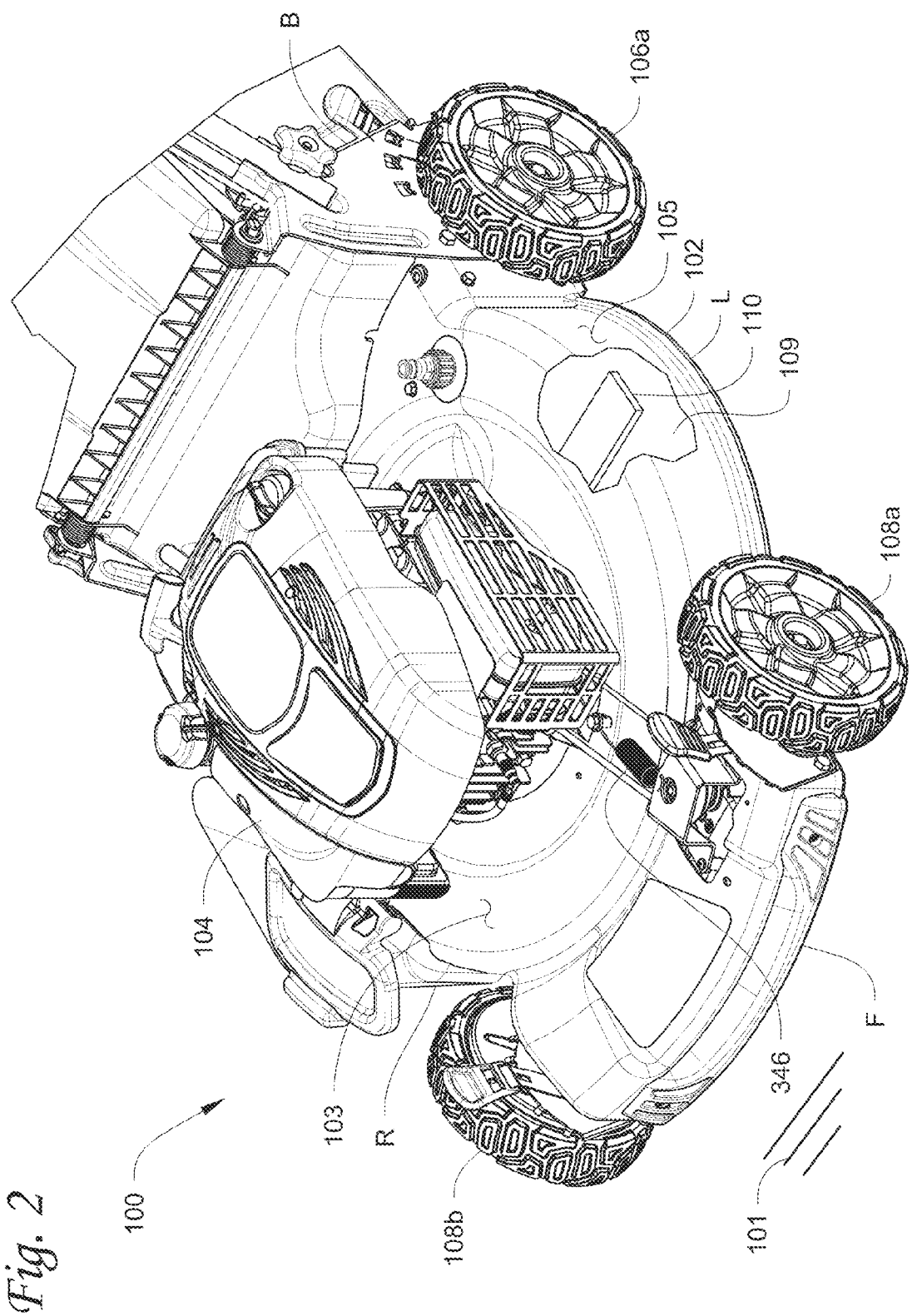
FIG. 2 is an enlarged perspective view of the mower of FIG. 1 with structure removed to better illustrate aspects of the AWD control system.

FIGS. 1 and 2 illustrate the exemplary mower 100 (FIG. 2 is an enlarged view of a portion of the mower 100 with some structure (e.g., front transmission cover 107) removed, and a portion of the mower shown cutaway). As shown in these views, the mower 100 may include a housing (e.g., deck 102) having front (F) and rear or back (B) sides or edges, and left (L) and right (R) sides or edges. The mower 100 may further include, for supporting the mower 100/deck 102 in rolling engagement with the ground surface 101, a plurality of ground-engaging support wheels. For example, rear wheels 106 (e.g., only left rear wheel 106a visible in FIG. 1, but see FIG. 3) and front wheels 108 may be provided generally at rear and front corners of the deck 102, respectively. The deck 102 may include an upper wall 103 and one or more downwardly extending sidewalls 105 that together define a downwardly (as viewed in FIG. 1) opening cutting chamber 109 (see FIG. 2). The mower 100 may also include a prime mover, e.g., an internal combustion engine 104 that, in one embodiment, is mounted on the upper wall 103 of the deck 102. While illustrated herein as an internal combustion engine 104, alternative power systems, such as an AC- or DC-powered electric motor, are also contemplated.

The engine 104 may be oriented such that its output shaft (crankshaft 111, see FIG. 3) extends vertically downward through the upper wall 103 of the deck 102 and into the cutting chamber 109. A ground-working tool (e.g., cutting member or blade 110; see FIG. 2) may attach to an end of the crankshaft. During operation, the crankshaft rotates the cutting blade at a speed sufficient to sever grass and other vegetation over which the mower 100 passes.

Figure 3:
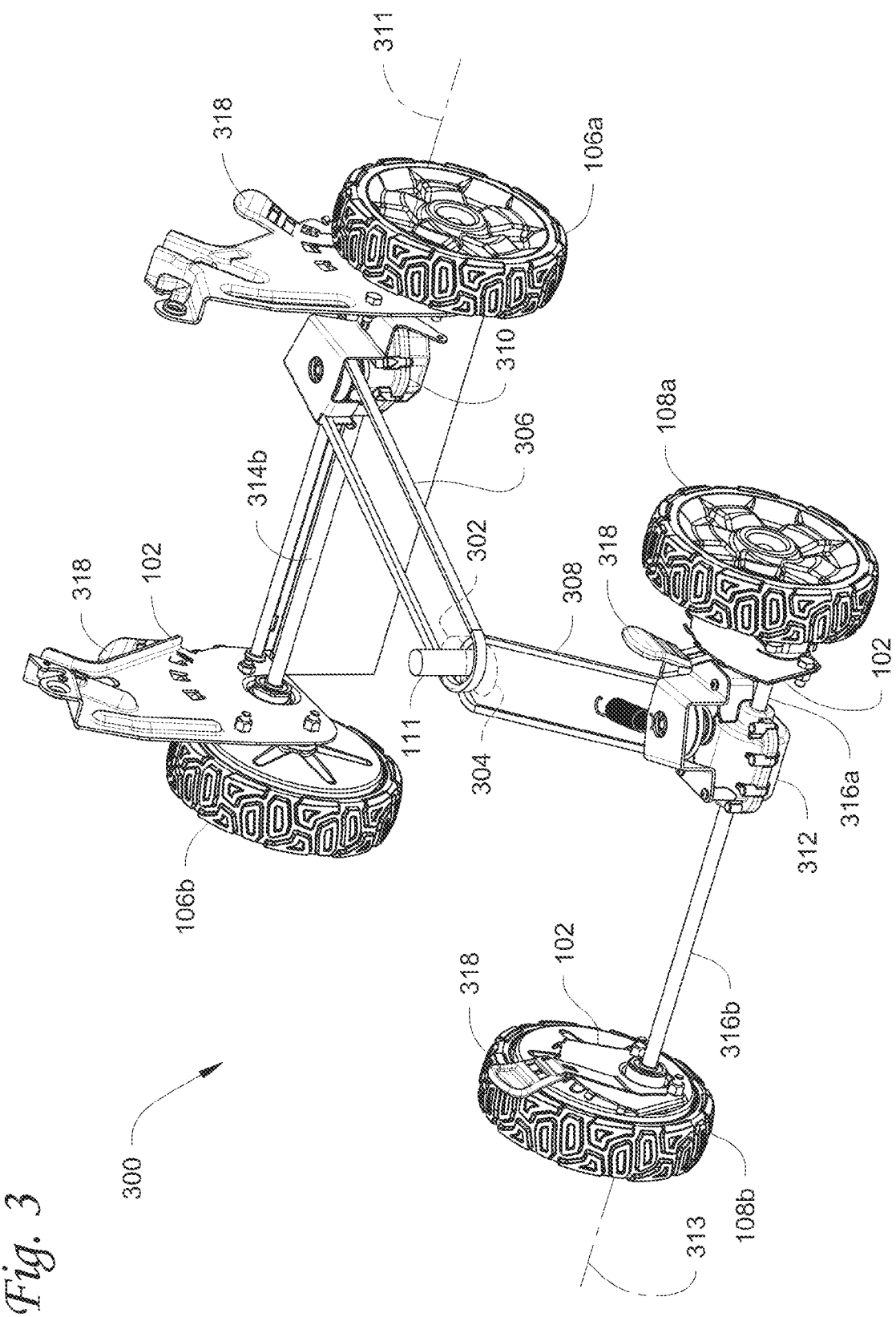
FIG. 3 is a perspective view of the mower of FIG. 1 with structure removed to better illustrate an exemplary drive system.

FIG. 3 illustrates an AWD propulsion system 300 in accordance with one embodiment of the disclosure, the system illustrated with most mower structure removed. As shown in this view, in addition to rotating the cutting blade 110 (not shown in FIG. 3), the crankshaft 111 may also power sheaves 302, 304. The sheave 302 may, via an endless drive belt 306, selectively power an input sheave of a rear transmission 310, while the sheave 304 may, via an endless drive belt 308, selectively power an input sheave of a front transmission 312.

Each of the transmissions 310, 312 may be adapted to drive attached output axles. For example, the rear transmission 310 may include output axles 314 (only axle 314b visible in this view) extending from the rear transmission to each of the rear wheels 106. Likewise, the front transmission 312 may include output axles 316 (316a and 316b) extending from the front transmission to each of the front wheels 108 (it is noted that, given the lateral offset of the transmissions, the left side axles (314a, 316a) are shorter that the right side axles 314b, 316b). Each of the axles 314, 316 may be journalled relative to the deck 102 (e.g., at or near their respective wheels) so that the axles (and transmissions) are supported by the deck. In some embodiments, each axle journal is formed as part of a height of cut mechanism 318 that allows the operator to change (e.g., raise and lower) the wheels relative to the deck to correspondingly alter the height of cut of the mower. While shown as incorporating individual height of cut mechanisms 318 for each wheel 106, 108, other embodiments may incorporate a single-point height of cut mechanism.

By journalling each axle 314, 316 as shown, the axles (and their corresponding transmissions 310, 312) may rotate about axle axes (e.g., the transmission 310 may rotate about an axis 311 of the axles 314, while the transmission 312 may rotate about an axis 313 of the axles 316). Accordingly, each transmission may be selectively actuated or engaged for propulsion by pivoting or rotating slightly (e.g., "rocking") about its respective axle axis between a neutral position (corresponding to a neutral state of the respective transmission) and an engaged position (corresponding to an engaged state of the respective transmission). When this occurs, each belt (e.g., 306, 308) may be tensioned sufficiently to effectively transmit torque from the crankshaft 111 to its respective transmission, thereby selectively providing driving power to the front wheels 108 (e.g., via the front transmission 312) and the rear wheels 106 (e.g. via the transmission 310).

In order to permit operator control of the mower 100, a handle assembly 120 (see FIG. 1 may be included). In some embodiments, the handle assembly 120 may be formed by one or more handle members or tubes 122 (122a, 122b) that attach to the deck 102 and extend generally upwardly and rearwardly as shown in FIG. 1. In the illustrated embodiment, the handle members 122 are laterally spaced-apart and parallel as shown. The handle assembly 120 may further include one or more grip handles 124 located at or near a distal (upper) end. The grip handle(s) 124 may connect the upper ends of the handle members 122 to produce, as shown in FIG. 1, a generally U-shaped handle assembly.

The handle assembly 120 (e.g., the handle members 122 and/or the grip handle 124) may include or form various controls (e.g., drive transmission, operator presence control, etc.) for operating the mower. For example, the grip handle 124 may form, in one embodiment, a variable speed input device. As a result, an operator walking behind the mower 100 may grasp the grip handle and control mower operation via manipulation of the grip handle and/or the various controls located thereon. In some embodiments, the handle assembly 120/grip handle 124 may be configured similarly to that described in U.S. Pat. No. 6,082,083 to Stalpes et al.

Figure 4:
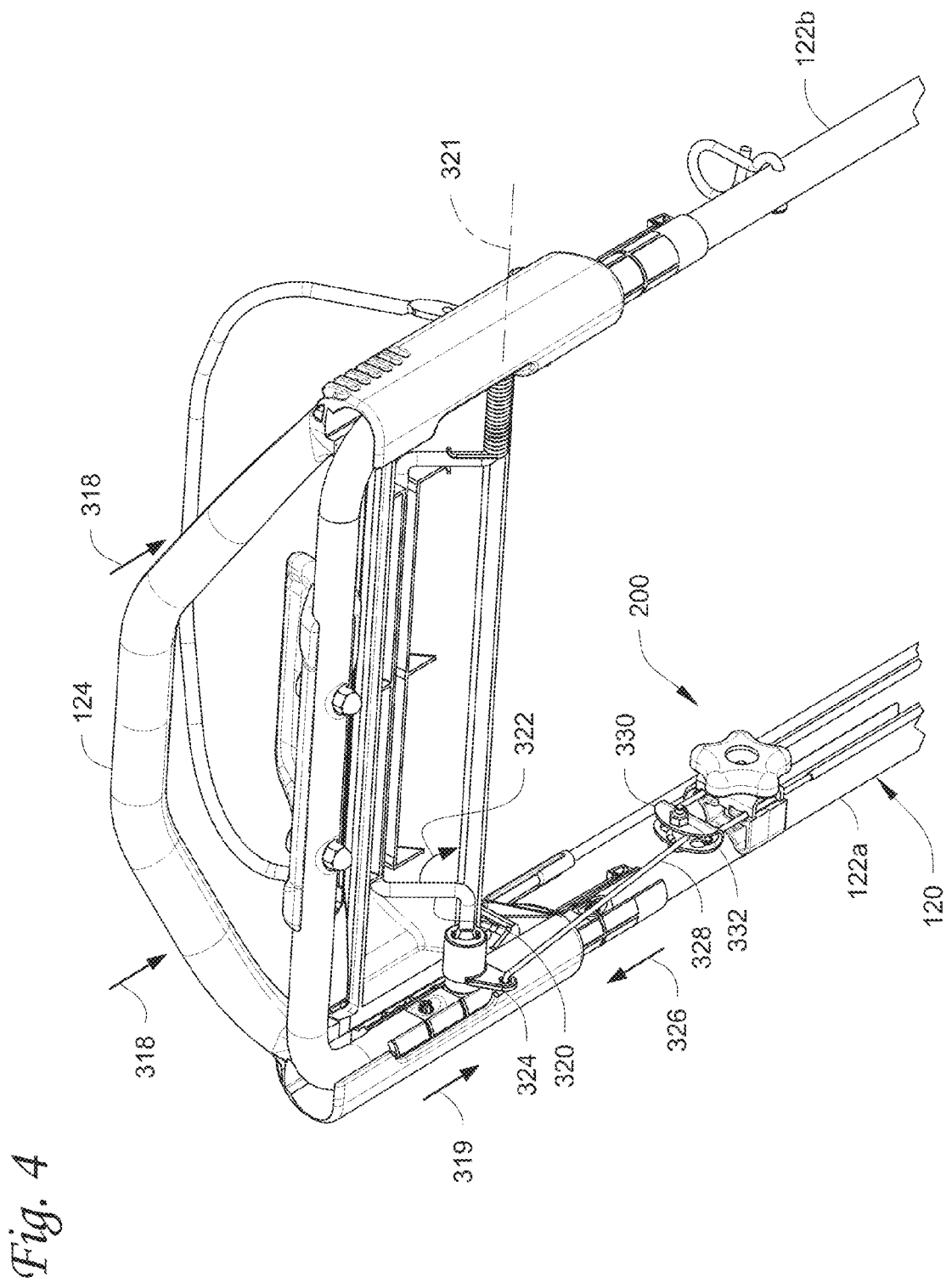
FIG. 4 is a rear perspective view of a portion of the mower, e.g., a handle assembly, in accordance with one embodiment.

FIG. 4 provides a rear perspective view of the grip handle 124 in accordance with one embodiment of the disclosure. As shown in this view, when the operator provides a drive force (e.g., applies a pushing load 318 at the grip handle 124), it causes the grip handle to translate along the handle members 122 (e.g., in the direction 319). As this occurs, the handle 124 pivots a lever 320 about an axis 321 in a direction 322. An arm 324 attached to the lever 320 accordingly rotates, imparting a drive or input force or vector 326 (e.g., pulling load) to an axial force member, e.g., link 328.

Figure 5:
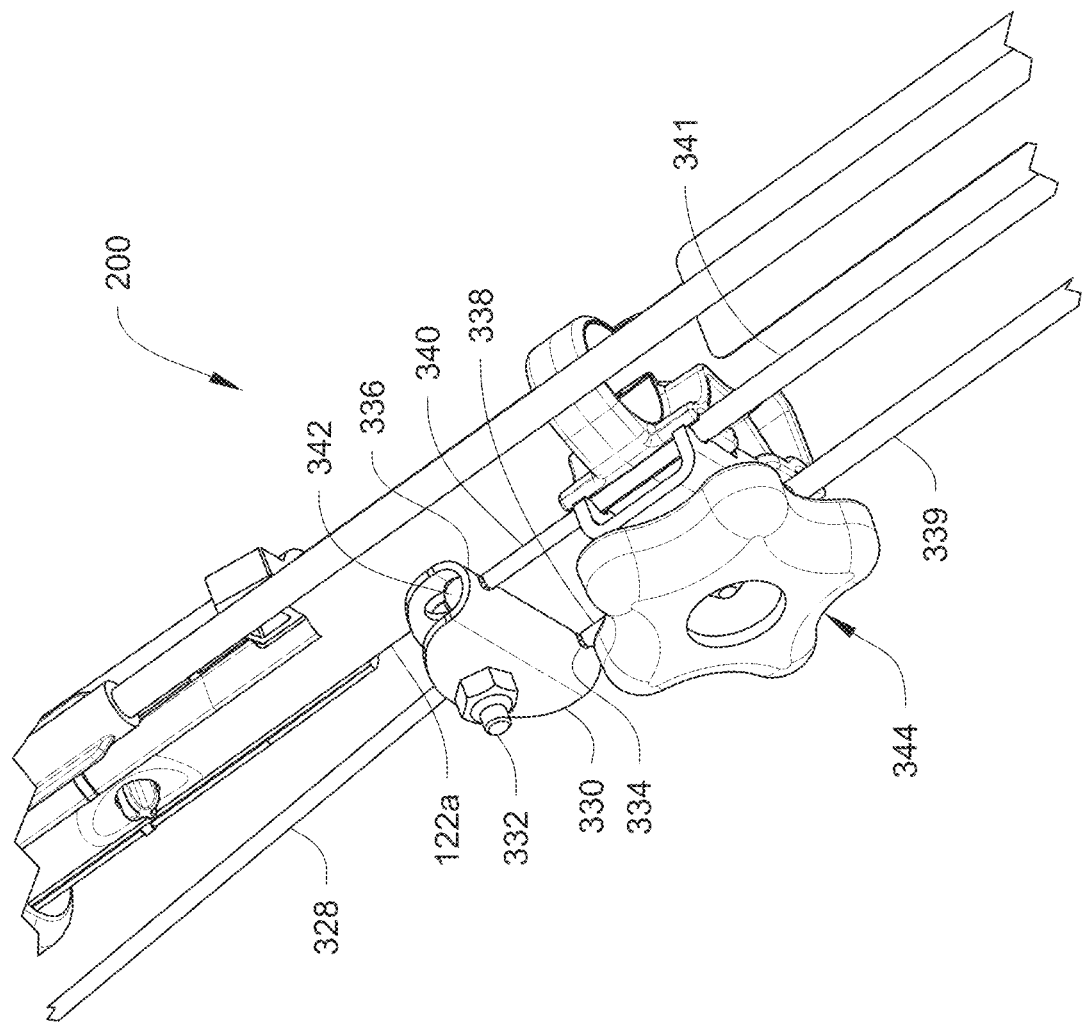
FIG. 5 is a perspective view of a portion of the AWD control system, e.g., a load balancer, in accordance with one embodiment of the disclosure.
Figure 6:
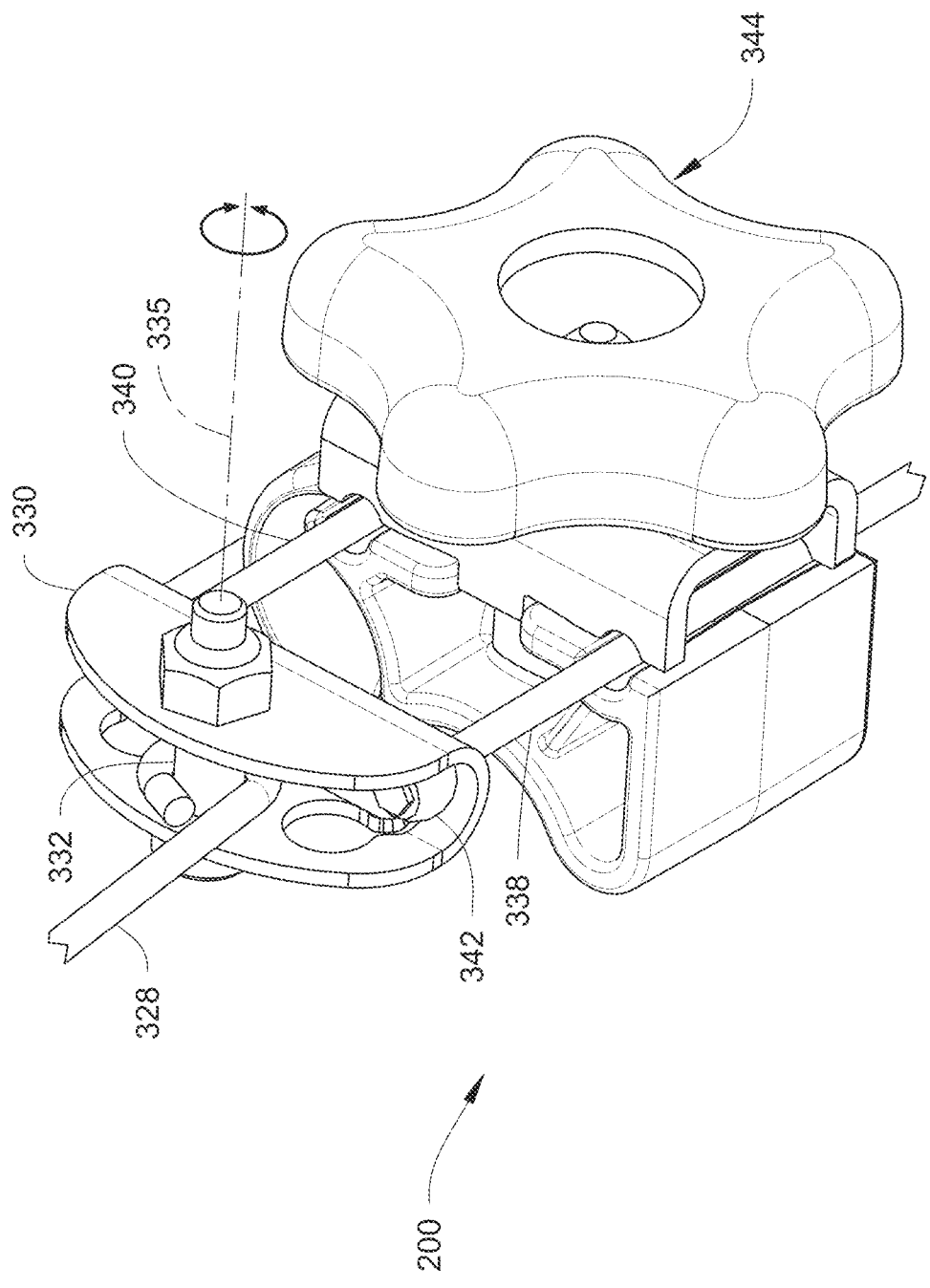
FIG. 6 is an enlarged perspective view of the load balancer of FIG. 5.
Figure 7:
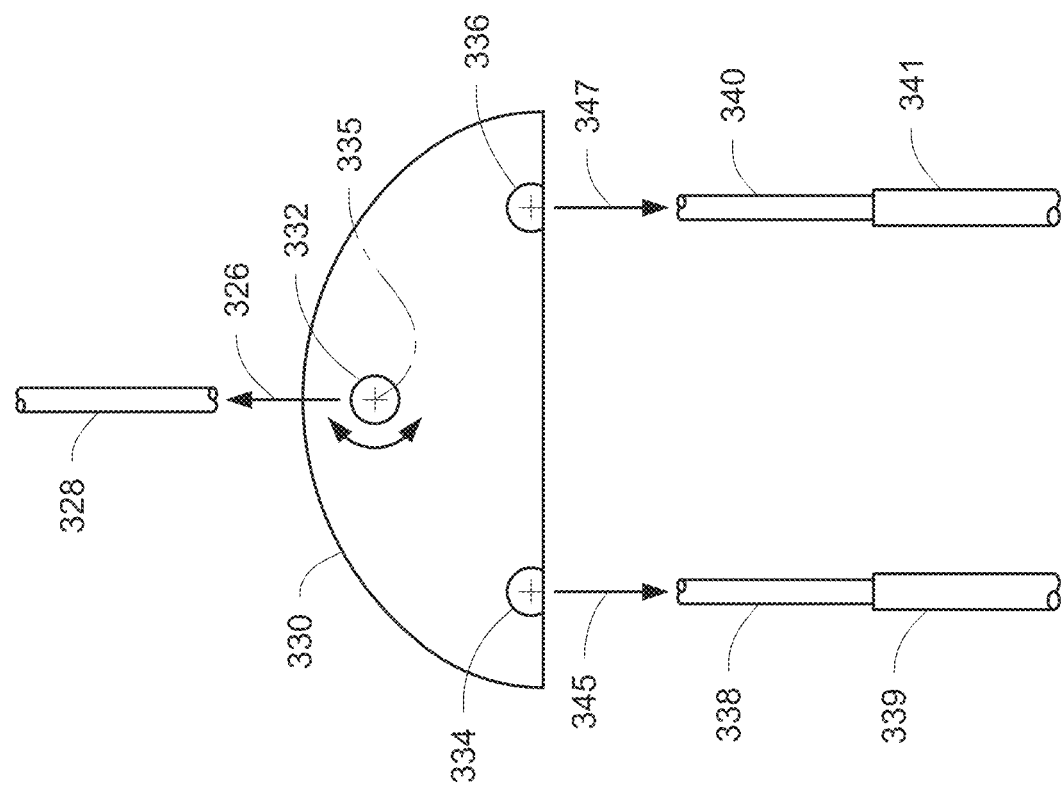
FIG. 7 is a diagrammatic view of the load balancer of FIG. 6.

An opposite end of the link 328 connects to an input 332 of a mechanical load balancer 330 that is further illustrated in FIGS. 5-7. The load balancer 330 may also include a first output 334 and a second output 336. In the illustrated embodiment, the first output 334 receives an end of a first connection element (e.g., cable 338) connected to the rear transmission 310, while the second output 336 receives an end of a second connection element (e.g., cable 340) connected to the front transmission 312. The ends of the cables 338, 340 may form spherical terminations 342 (see, e.g. FIG. 6) that permit the ends to rotate slightly within respective seats of the outputs of the load balancer 330. As further described below, the first and second cables may be adapted to selectively actuate the rear and front transmissions, respectively, from the neutral state to the engaged state in response to manipulation of the speed input device.

Cable housings 339 and 341 are associated with each of the cables 338 and 340, respectively. Known in the art as Bowden cables, the cables 338 and 340 may slide within their respective housings 339 and 341, thereby permitting the cables to transmit force. As shown in FIGS. 5 and 6, an adjustable anchor 344 may be provided to permit adjustment of each of the cable housings 339, 341 relative to fixed structure (e.g., relative to the handle member 122a).

The input 332 (which, in one embodiment, is configured as a pivot or pin joint as shown in FIGS. 6 and 7) of the load balancer 330 is configured to permit the load balancer to pivot (e.g., about axis 335) relative to the input. As a result, the input or drive force vector 326 applied by the link 328 at the input 332 may be distributed equally between the first output 334 and the second output 336 (e.g., distributed equally and simultaneously as two output forces or vectors 345 and 347 carried by the rear and front cables 338 and 340, respectively). Such equivalent loading may be achieved without the need for sophisticated mechanisms and without requiring matched adjustment of the cables.

Figure 8:
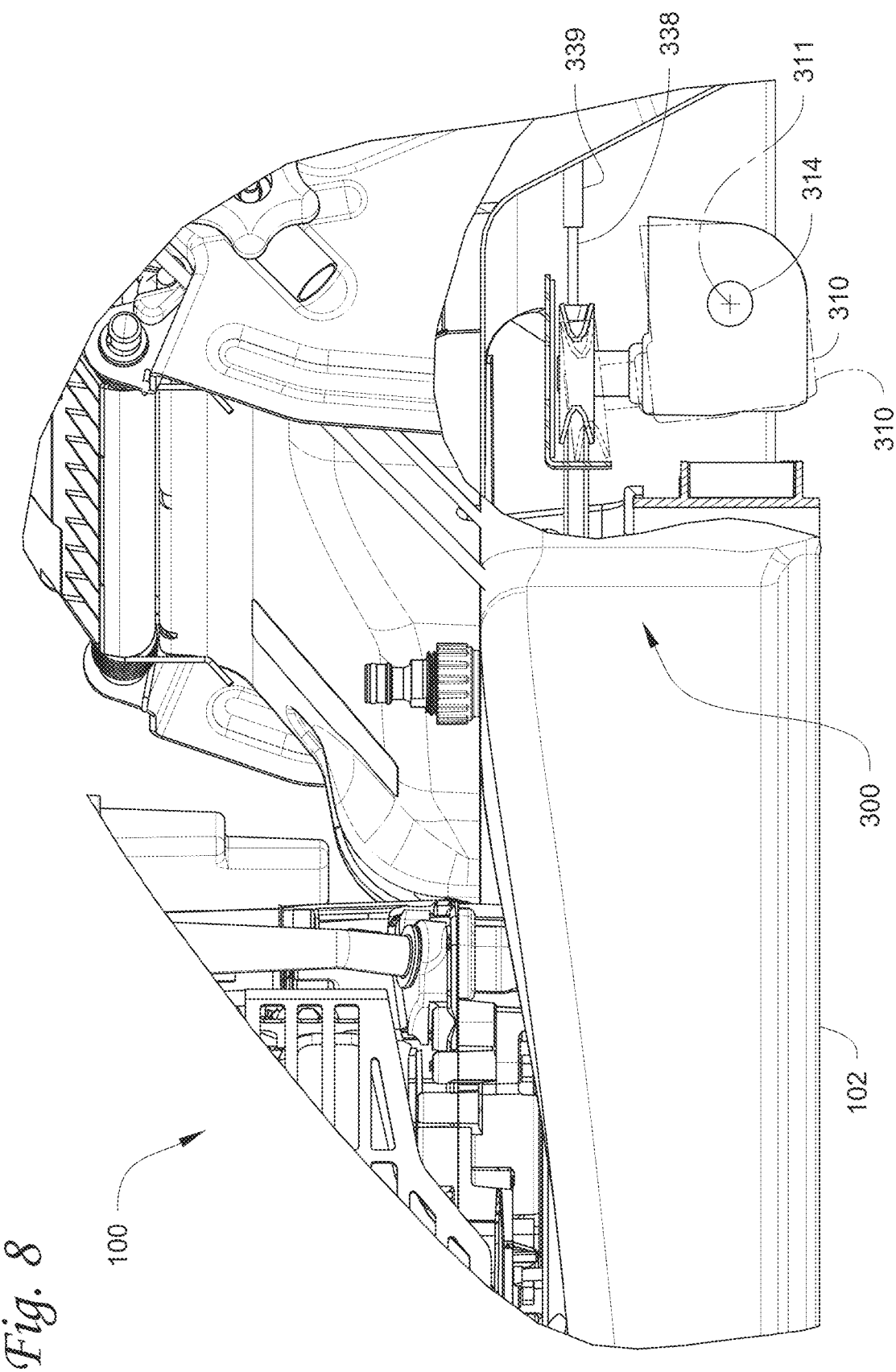
FIG. 8 is a partial cutaway side elevation view of the mower of FIG. 1 illustrating a rear transmission in accordance with one embodiment.

FIG. 8 is a partial cutaway, side elevation view of the mower 100 showing the rear transmission 310 in both a neutral (non-driving) state or position (in broken lines), and in a fully engaged state or position (solid lines). As further shown in this view, an end of the cable 338 may attach to the transmission 310, while the cable housing 339 may be anchored to surrounding deck structure. As a result, when the grip handle 124 is displaced (e.g., in the direction 318 of FIG. 4), the load balancer 330 pulls on the cable 338, causing the rear transmission 310 to pivot (e.g., about the axis 311 of the axles 314) from the neutral position toward the fully engaged position. Of course, the engagement of the rear transmission 310 (and the front transmission 312) may be proportional to the displacement of the handle 124. That is to say, the degree of engagement of the transmissions 310, 312, and thus the speed of the mower, may be dictated by the magnitude of the pushing load 318 (see FIG. 4) and the resulting magnitude of the drive force vector 326 (see FIG. 7).

Figure 9:
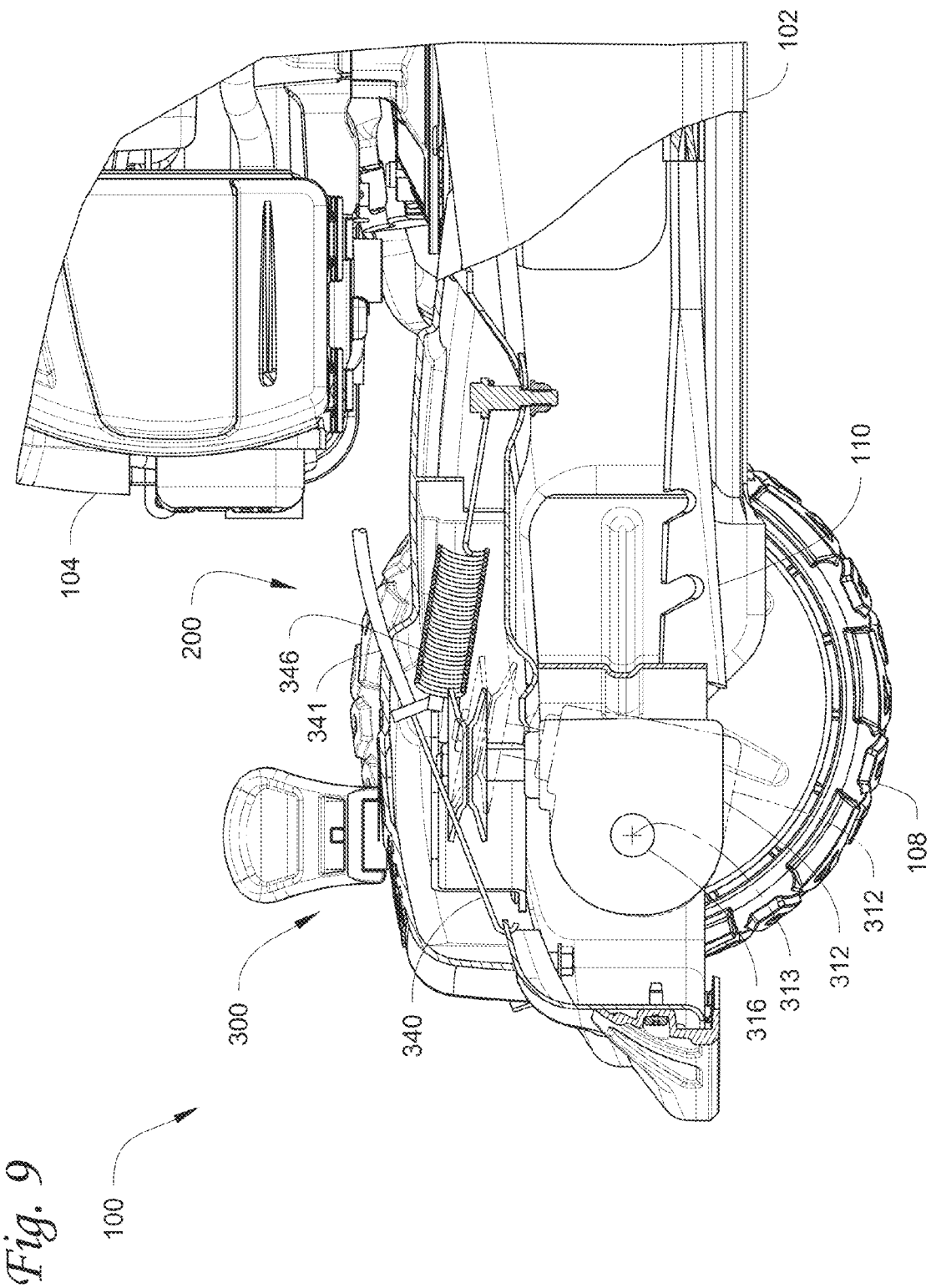
FIG. 9 is a partial cutaway side elevation view of the mower of FIG. 1 illustrating a front transmission in accordance with one embodiment.

FIG. 9 is a partial cutaway, side elevation view of the mower 100 showing the front transmission 312 in both a neutral (non-driving) position (in broken lines), and in a fully engaged position (solid lines). As further shown in this view, an end of the cable 340 may anchor to deck structure, while the cable housing 341 may be anchored to the front transmission 312 itself. As a result, when the grip handle 124 is displaced (e.g., in the direction 318 of FIG. 4), the load balancer 330 pulls on the cable 340 (with a force equivalent to that imparted to the cable 338), causing the front transmission 312 to pivot (e.g., about the axles 316) from the neutral position toward the fully engaged position. The load balancer may be able to maintain this equivalent force output to cables 338 and 340 even as one or more of the belts 306, 308 stretch over time.

While described herein as being actuated by rocking or pivoting, each of the transmissions may, in other embodiments, be actuated in alternative manners. For example, the transmissions could be rigidly mounted and their actuation could be via a cable-actuated lever arm. In other embodiments, each transmission could again be rigidly mounted and actuation could occur via idler pulleys that tension the respective drive belts (e.g., 306, 308) under the control of the associated cables (e.g., 338, 340).

Based upon the configurations illustrated in the figures and described above, the rear transmission 310 and front transmission 312 may, therefore, receive equivalent actuation forces (from their respective cables 338, 340) upon operator-initiated movement of the grip handle 124. It has been found, however, that due to the reduced weight borne by the front wheels 108, the front wheels may begin to rotate upon movement of the grip handle 124 before rotation of the more heavily-loaded rear wheels. This behavior may result in unintended spinning of the front wheels 108 prior to and during initial mower 100 movement. Not only may some operators find this behavior undesirable, but the spinning front wheels could, in some circumstances, damage fragile turf.

To address this issue, a resistance or biasing element associated with the front transmission 312 may be provided. In the illustrated embodiment (see, e.g., FIGS. 2 and 9), the resistance element is configured as a spring 346 (e.g., an extension spring). The spring 346 may be connected between mower structure (e.g., the housing or deck 102) and the front transmission 312. The spring 346 may be configured to resist initial movement or actuation of the front transmission away from the neutral position, e.g., the spring may bias the front transmission to its neutral position. Stated alternatively, the resistance element may define a resistance (e.g., second) force that resists the actuation force applied to one (e.g., the front) transmission, wherein this resistance force is greater that any corresponding (e.g., first) force resisting the actuation force applied to the other (e.g., rear) transmission (this first force would be the force resisting rocking of the rear transmission). When the force imparted by the second connection element (e.g., cable 340) exceeds this second force, the front transmission may begin to actuate. While shown as an extension spring, the resistance element could be configured as most any biasing element (e.g., compression spring or other resilient member) without departing from the scope of this disclosure.

With the spring 346 in place as shown in FIG. 9 (spring shown in cross section in this figure), the actuation force required of the front cable 340 to actuate, e.g., rock, the front transmission 312 from its neutral position to an engaged position (the latter including any intermediate position between the neutral position and the fully engaged position) is initially higher than the actuation force required of the rear cable 338 to actuate e.g., move, the rear transmission 310 from its neutral position to an equivalent intermediate position. As a result, output torque produced by the front transmission 312 may lag the output torque produced by the rear transmission 310, at least for initial movement of the speed input (e.g., the grip handle 124). However, due to the configuration of the mower (e.g., heavier weight carried by the rear wheels and the corresponding relatively higher transmission output torque needed to initiate rotation of the rear wheels), this momentary output lag may effectively cause the front transmission and the rear transmission to begin driving their respective wheels at or near the same time. Stated alternatively, as the rear wheels begin driving, the biasing force of the spring 346 is overcome and the front transmission also engages in proportion to the movement of the grip handle 124. The end result is that all wheels (front and rear) begin driving at or very near the same time, reducing or even avoiding the front wheel slippage that might otherwise occur. For higher speeds (e.g., at or near a maximum position of the grip handle 124), the output torque of the front transmission 312 may reach the same output torque as the rear transmission 310 as, at some point, the rear transmission will reach its maximum engaged position and further movement of the grip handle 124 will have no effect on its output.

Thus, by carefully selecting the spring 346 (e.g., the spring rate of the spring), the control system 200 may delay or offset actuation of the front transmission such that its output is timed to generally match, or momentarily lag, output of the more heavily-loaded rear transmission upon initial movement of the grip handle 124. This functionality may allow the rear transmission 310/rear wheels 106 to initiate propulsion of the mower 100 as the front transmission starts to engage, thereby avoiding excessive, tractionless spinning of front transmission/front wheels 108 as may occur without the spring 346.

The spring 346 may be selected not only to address premature output of the front wheels (e.g., as a result of the lighter weight borne by the front wheels), but may also address differences in mower construction. For example, the spring may be selected to account for differences in the distance of the force vector applied by the rear cable 338 relative to the rear transmission axis 311 (see FIG. 8) compared to the distance of the force vector applied by the front cable 340 relative to the front transmission axis 313 (see FIG. 9). Moreover, the spring 346 may be selected to provide the generally simultaneous front and rear transmission engagement when the exemplary mower is operating upon a turf surface. As used herein, the phrase "turf surface," unless otherwise indicated, refers to a horizontal (flat) and dry grass surface. Various factors (e.g., different (e.g., wet) surface, inclined mower operation, tire and tread design, etc.) may impact the effects of the spring.

While shown and described as being associated with the front transmission, other embodiments may associate the resistance element with the rear transmission. Such a configuration may be beneficial, for example, with a reel mower.

While specific embodiments are described and illustrated herein, such embodiments are intended to be exemplary only and other configurations are certainly possible without departing from the scope of the disclosure. For example, while the first and second outputs are shown as being spaced-apart equidistantly from the input, they could, in other embodiments, be differentially spaced from the input. Such a configuration may provide differential engagement forces to the front and rear transmissions (via the respective connection elements) such that the spring 346 is not necessary.

The complete disclosure of the patents, patent documents, and publications cited herein are incorporated by reference in their entirety as if each were individually incorporated.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. An all-wheel drive power equipment unit comprising:
   a housing comprising front wheels and rear wheels, wherein a front transmission is adapted to selectively provide driving power to the front wheels, and a rear transmission is adapted to selectively provide driving power to the rear wheels;
   a variable speed input device;
   a first connection element operatively connected to the rear transmission, the first connection element adapted to selectively actuate the rear transmission from a neutral state to an engaged state in response to manipulation of the speed input device;
   a second connection element connected to the front transmission, the second connection element adapted to selectively actuate the front transmission from a neutral state to an engaged state in response to the manipulation of the speed input device;
   a mechanical load balancer comprising:
      an input connected to the variable speed input device;
      a first output connected to the first connection element; and
      a second output connected to the second connection element, wherein the load balancer is adapted to distribute a force applied at the input equally between the first output and the second output; and
   a resistance element associated with the front transmission, the resistance element defining a second force resisting actuation of the front transmission, wherein the second force is greater than a first force resisting actuation of the rear transmission.

2. The power equipment unit of claim 1, wherein the first and second connection elements each comprise a cable.

3. The power equipment unit of claim 1, wherein each of the front and rear transmissions are selectively actuated by rocking between a neutral position corresponding to the neutral state, and an engaged position corresponding to the engaged state.

4. The power equipment unit of claim 3, wherein the resistance element comprises a spring attached between the front transmission and the housing, the spring adapted to bias the front transmission to the neutral position.

5. The power equipment unit of claim 1, wherein the input of the load balancer comprises a pivot adapted to attach to the speed input device with an axial force member.

6. The power equipment unit of claim 1, wherein the first output and the second output are spaced-apart equidistantly from the input.

7. The power equipment unit of claim 1, wherein the front and rear transmissions each comprise a sheave coupled, via an endless belt, to an output shaft of an engine attached to the housing of the power equipment unit.

8. An all-wheel drive walk-behind lawn mower, the mower comprising:
   a deck comprising front wheels and rear wheels;
   a front transmission adapted to selectively provide driving power to the front wheels, the front transmission adapted to rock between a neutral position and an engaged position;
   a rear transmission adapted to selectively provide driving power to the rear wheels, the rear transmission adapted to rock between a neutral position and an engaged position;
   a variable speed input device;
   a first connection element connected to the rear transmission, the first connection element adapted to selectively rock the rear transmission from the neutral position to the engaged position;
   a second connection element connected to the front transmission, the second connection element adapted to selectively rock the front transmission from the neutral position to the engaged position;
   a mechanical load balancer comprising:
      an input connected to the variable speed input device;
      a first output connected to the first connection element; and
      a second output connected to the second connection element, wherein the load balancer is adapted to distribute a force applied at the input equally between the first output and the second output; and
   a resistance element associated with either the rear transmission or the front transmission, the resistance element adapted to define a second force required by the associated first or second connection element to initiate rocking of the respective rear or front transmission from the neutral position, wherein the second force is greater than a first force required by the other of the first or second connection elements to initiate rocking of its respective rear or front transmission from the neutral position.

9. The mower of claim 8, wherein the resistance element is a spring.

10. The mower of claim 8, wherein the resistance element is an extension spring.

11. The mower of claim 8, wherein the first and second connection elements each comprise a Bowden cable.

12. The mower of claim 8, wherein the rear transmission is powered via a first endless drive belt, and the front transmission is powered via a second endless drive belt.

13. The mower of claim 8, wherein the first and second outputs of the load balancer are each spaced-apart equidistantly from the input.

14. A method for controlling an all-wheel drive system for a walk-behind lawn mower, the method comprising:
displacing a speed control device, the speed control device adapted to provide an input force to an input of a load balancer;
displacing first and second connection elements attached to respective first and second outputs of the load balancer, wherein a first and second output force applied to the first and second connection elements, respectively, is equalized by the load balancer;
applying, simultaneously, the first and second output force to a rear transmission and a front transmission, respectively;
actuating the rear transmission and the front transmission from a neutral state toward an engaged state; and
providing, with a resistance element, a second force resisting initial actuation of the front transmission, wherein the second force is greater than a first force resisting initial actuation of the rear transmission.

15. The method of claim 14, wherein actuating the rear transmission and the front transmission comprises rocking the rear and front transmissions relative to a deck of the mower.

16. An all-wheel drive walk-behind lawn mower comprising:
a housing comprising front wheels and rear wheels, wherein a front transmission is adapted to selectively drive the front wheels, and a rear transmission is adapted to selectively drive the rear wheels, wherein the rear wheels bear more weight than the front wheels;
a variable speed input device;
a first cable operatively connected to the rear transmission, the first cable adapted to selectively actuate the rear transmission from a neutral state to an engaged state in response to manipulation of the speed input device;
a second cable connected to the front transmission, the second cable adapted to selectively actuate the front transmission from a neutral state to an engaged state in response to the manipulation of the speed input device;
a mechanical load balancer comprising:
an input connected to the variable speed input device;
a first output connected to the first cable; and
a second output connected to the second cable, wherein the load balancer is adapted to distribute a force applied at the input equally between the first output and the second output; and
a resistance element associated with the front transmission, the resistance element providing a second force resisting actuation of the front transmission, wherein the second force is greater than a first force resisting actuation of the rear transmission,
wherein the second force provided by the resistance element causes the front wheels and the rear wheels to begin driving at or near the same time when the mower is operating upon a horizontal turf surface.

17. The mower of claim 16, wherein the resistance element comprises a spring connected between the front transmission and the housing.

* * * * *